(12) United States Patent
Hata et al.

(10) Patent No.: US 8,890,804 B2
(45) Date of Patent: Nov. 18, 2014

(54) COORDINATE SENSOR AND DISPLAY DEVICE

(75) Inventors: Masayuki Hata, Osaka (JP); Toshiaki Nakagawa, Osaka (JP); Toshiyuki Yoshimizu, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 411 days.

(21) Appl. No.: 13/391,995

(22) PCT Filed: Apr. 15, 2010

(86) PCT No.: PCT/JP2010/002747
§ 371 (c)(1),
(2), (4) Date: Mar. 13, 2012

(87) PCT Pub. No.: WO2011/024347
PCT Pub. Date: Mar. 3, 2011

(65) Prior Publication Data
US 2012/0162064 A1 Jun. 28, 2012

(30) Foreign Application Priority Data
Aug. 25, 2009 (JP) ................................. 2009-194373

(51) Int. Cl.
*G06F 3/042* (2006.01)
*G01V 8/20* (2006.01)

(52) U.S. Cl.
CPC .............. *G01V 8/20* (2013.01); *G06F 3/0421* (2013.01)
USPC ........................... 345/156; 345/157; 345/173

(58) Field of Classification Search
CPC .................................................... G06F 3/0421
USPC .................................................. 345/156–178
See application file for complete search history.

(56) References Cited

U.S. PATENT DOCUMENTS

| 5,577,848 | A | * | 11/1996 | Bowen ........................ 400/472 |
| 2009/0207194 | A1 | * | 8/2009 | Wang et al. .................. 345/690 |
| 2009/0225058 | A1 | * | 9/2009 | Tateuchi et al. .............. 345/175 |

FOREIGN PATENT DOCUMENTS

| JP | 02-242417 A | 9/1990 |
| JP | 2005-339342 A | 12/2005 |
| JP | 3797803 B2 | 7/2006 |
| JP | 2008-186374 A | 8/2008 |

OTHER PUBLICATIONS

International Search Report (ISR) issued in PCT/JP2010/002747 mailed in Jun. 2010.

* cited by examiner

*Primary Examiner* — Joe H Cheng
*Assistant Examiner* — Lisa Landis
(74) *Attorney, Agent, or Firm* — Chen Yoshimura LLP

(57) ABSTRACT

The amount of the light emitted from a light-emitting diode is changed from that of the initial condition to increase, among the light sensors that are not shielded from the light emitted from the light-emitting diode, the number of the light sensors at which the difference (C–D) between the light detection amount at the light sensor when the light-emitting diode is ON and the light detection amount at the light sensor when the light-emitting diode is OFF is equal to the difference (A–B) between the light detection amount at the light sensor in the initial condition when the light-emitting diode was ON and the light detection amount at the light sensors in the initial condition when the light-emitting diode was OFF with no detection object present. As a result, regardless of the presence or absence of the detection object, the coordinate sensor and the display device disclosed can establish a threshold for determining the presence or absence of the detection object, and can also determine the coordinates of the detection object in a stable manner regardless of changes in the ambient environmental light or in the ambient environmental temperature, or fluctuations in the amount of light emitted from the light-emitting element disposed in the coordinate sensor or the change in the sensitivity of the light-receiving elements.

15 Claims, 7 Drawing Sheets

COORDINATE SENSOR AND DISPLAY DEVICE

TECHNICAL FIELD

The present invention relates to a coordinate sensor that detects a detection object such as a finger or a pen, and to a display device equipped with such a coordinate sensor.

BACKGROUND ART

In recent years, touch panels (coordinate sensors) have been in wide use as a device for entering data into electronic instruments having multi-functionality such as portable phones, PDAs (Personal Digital Assistant), MP3 players, and car navigation systems equipped with mid- to small-size displays. Touch panels are also increasingly used for larger display devices.

Conventionally, most touch panels used in such devices having touch panels are resistive or capacitive touch panels. These conventional touch panels, however, have some problems. For example, because they need a special panel for detecting locations, the entire device becomes thick. Also, the touch panel provided in the display region of the display device negatively affects the visibility.

To solve these problems, in place of above-mentioned resistive or capacitive touch panels, display devices with built-in touch panel, i.e., so-called two-dimensional sensor array, have been developed, where light-receiving elements (light sensor elements) such as photodiodes and photo transistors are included in the display area of the display device.

However, one problem with the configuration mentioned above is a reduced aperture ratio, which is caused by a large number of light receiving elements arranged two-dimensionally in the display area. Also, the light signal read-out circuit is very complex.

To solve the problems, display devices with a built-in coordinate sensor have been developed. In those display devices, bus lines (scan signal wiring and data signal wiring) for display elements (drive element) such as TFTs (Thin Film Transistors) provided in the display region also serve as bus lines (scan signal wiring and data read-out wiring) for light-receiving elements. Here, display and sensing are conducted in a time-division manner, providing a display device with a built-in coordinate sensor that can suppress the aperture ratio reduction.

However, in the above-mentioned configuration, because display and sensing are conducted in a time-division manner, the operation speed is restricted.

For this reason, display devices with built-in optical scanning touch panel without the above-mentioned two-dimensional sensor array has been developed. Such display devices do not have the above-mentioned problem of reduced aperture ratio or restricted operation speed.

In Patent Document 1, for example, an optical scanning touch panel is disclosed. This optical scanning touch panel, as shown in FIG. 11, includes light-emitting/receiving units 101a and 101b, which are disposed outside of respective end portions of one short side (the side at right in the figure) of a rectangular display screen 100 to be touched by a pointer such as a finger or a pen (blocking item) S. The light-emitting/receiving units 101a and 101b respectively include light-emitting elements 111a and 111b, light-receiving elements 113a and 113b, polygon minors 116a and 116b, and the like, which constitute an optical system. Over the outer surfaces of the three sides of the display screen 100 except the side at right, a retroreflection sheet 102 is disposed.

In the light-emitting/receiving unit 101b of the above-mentioned optical scanning touch panel, the scanning of the light projected from the light-emitting/receiving unit 101b starts at the position at which the light directly enters the light-receiving element 113b, continues counterclockwise in FIG. 11 to the position at which the light projected from the light-emitting/receiving unit 101b is blocked by the light-shielding member 170 provided to prevent the light from entering the light-emitting/receiving unit 101a, and further proceeds to position (Ps) at which the light is reflected by an end portion of the retroreflection sheet 102. Then, the light is reflected by retroreflection sheet 102 before position (P1) at which the light encounters one end of pointer S, but after position (P1) and before position (P2) at which the other end of pointer S is reached, the light is blocked by pointer S. After position (P2) and until the later scanning position (Pe) is reached, the light is reflected by the retroreflection sheet 102.

According to the configuration described above, the light reflected by the retroreflection sheet 102 is detected, and the range in which the detection level of the returned light is smaller than a predetermined threshold is detected as a shielded range where the light is blocked by a finger or a pen.

In the disclosure, it is stated that the threshold setting may be changed frequently according to the noise in the light reception system, operation environment, and the like to improve the accuracy in the calculation of the location and size of the pointer S.

According to the configuration disclosed in Patent Document 1, the above-mentioned calculation accuracy is improved by using the following scheme.

When a light reception level below the predetermined threshold is not detected, that is, when pointer S is determined not present, for a prescribed length of time, the OFF signal is output from MPU to the light-emitting element driver circuit to stop the light-emitting operation of the light-emitting elements 111a and 111b. During this time, MPU adds a predetermined value (margin voltage) to the light reception output from the light-receiving elements 113a and 113b measured while the light-emitting elements 111a and 111b are OFF, and this value is set as the threshold so that any influence of the ambient environmental light can be eliminated.

The margin voltage is determined based on the fluctuation in the amount of the light received due to the noise in the light reception system, digitalization error occurred during the A/D conversion, and the accumulated time-series light reception data, and the like.

In this configuration, when pointer S is determined not present, the scanning light is turned off for a prescribed period of time to conduct the threshold setting process, and therefore, it is stated that the threshold can be set without interfering the derivation of the location and size of the pointer S.

RELATED ART DOCUMENTS

Patent Documents

Patent Document 1: Japanese Patent No. 3797803 (registered on Apr. 28, 2006)

SUMMARY OF THE INVENTION

Problems to be Solved by the Invention

However, in the configuration disclosed in Patent Document 1, the detection accuracy is improved by setting the threshold value such that any influence of the ambient environmental light can be eliminated when pointer S is determined not present, based on the light reception results of the light-receiving elements 113*a* and 113*b* when the scanning light is turned off. As a result, the configuration disclosed in Patent Document 1 has the following problems.

That is, when pointer S is not present, the threshold can be set such that any influence of the ambient environmental light is eliminated. However, when pointer S is present, it is difficult to set the threshold.

Also, because data is obtained when the scanning light is turned off, the influence of the ambient environmental light can be reduced. However, correction covering influences of the fluctuation in the amount of the light from the light-emitting elements 111*a* and 111*b* and the fluctuation in sensitivity of the light-receiving elements 113*a* and 113*b* or the like are difficult to accomplish.

The present invention was devised in consideration of the problems discussed above, and is aiming at providing a coordinate sensor and a display device that, regardless of the presence or absence of an detection object (pointer), can set a threshold for determining the presence or absence of the detection object, and also can determine the coordinate of the object in a stable manner regardless of changes in the ambient environmental light and in the ambient environmental temperature, or fluctuations in the amount of the light emitted from the light-emitting element or in the sensitivity of the light-receiving elements, both disposed in the coordinate sensor.

Means for Solving the Problems

In order to solve the problem described above, the present invention provides a coordinate sensor including: a light-emitting element; at least two line sensors in which a plurality of light-receiving elements are arranged in X direction and Y direction, respectively; and a light-shielding body that prevents light other than light emitted from the light-emitting element from entering the light-receiving elements, wherein coordinates pointed by a detection object are determined in accordance with changes in light detection amounts at the light-receiving elements, and wherein the amount of light emitted from the light-emitting element is changed from that in an initial condition so as to increase, among the light-receiving elements receiving light from the light-emitting element without being blocked by a detection object, the number of the light-receiving elements in which a difference between (i) the light detection amount at the light-receiving element when the light-emitting element is ON and (ii) the light detection amount at the light-receiving element when the light-emitting element is OFF is equal to the corresponding difference in the light detection amount at the light-receiving element in its initial condition when no detection object is present.

The light other than the light emitted from the light-emitting element (sunlight, for example) cannot be completely blocked in environments such as outdoors where intense sunlight is present, even if a light-shielding body is provided to prevent such light from entering the light-receiving element.

The amount of the light other than the light emitted from the light-emitting element that is not blocked and therefore enters the light-receiving element is one of the factors that reduce the detection accuracy, because it acts as a noise in determining the pointer coordinates of the detection object.

If such a noise exceeds the threshold (reference value for determining whether the detection object is present or absent), it is difficult to find the pointer coordinates of the detection object.

Also, the light-emitting performance of the light-emitting element and the sensitivity of the light-receiving element deteriorate through use (aging). As a result, the light detection amount (the sensor output) at the light-receiving elements decreases.

Due to such aging, the amount of noise is reduced, but the light detection amount also reduces, and as the light detection amount approaches the threshold, false recognition tends to occur, which significantly lowers the detection accuracy of the pointer coordinates of the detection object.

Also, the light-emitting performance of the light-emitting element and the sensitivity of the light-receiving element can be influenced by the ambient environmental temperature as well, and therefore the noise level and the light detection amount fluctuate according to the ambient environmental temperature. For this reason, fluctuations in the ambient environmental temperature can cause a false recognition of the detection object, and can make it difficult to detect the detection object.

According to the configuration described above, the amount of the light emitted from the light-emitting element is controlled in such a way as to increase the number of the light-receiving elements, among the light-receiving elements receiving the light from the light-emitting element without being blocked by the detection object, whose difference in the light detection amount when the light-emitting element is ON and when the light-emitting element is OFF is equal to the difference in the light detection amount at the light-receiving elements in their initial condition (the difference in the amount of the received light when the light-emitting element was ON and when it was OFF).

That is, the amount of the light emitted from the light-emitting element is controlled and corrected using a reference value, which is the difference in the light detection amount at the light-emitting element in the initial condition when the light-emitting element in the initial condition was ON and when the light-emitting element in the initial condition was OFF. The initial condition refers to the stage in which any deterioration in the light-emitting performance of the light-emitting element or in the sensitivity of the light-receiving elements through use (aging) has virtually not occurred yet. The amount of the light emitted from the light-emitting element, which is experiencing the above-mentioned aging, is corrected such that the difference in the light detection amount at the light-receiving element, which is also experiencing aging, when the light-emitting element is ON and when the light-emitting element is OFF becomes equal to the above-mentioned reference value.

According to the configuration described, the influence of the ambient environmental light can be eliminated, because the difference in the amount of the light received when the light-emitting element is ON and when it is OFF is used. The influence of the ambient environmental temperature can be suppressed, because correction is made so that the difference in the light detection amount when the light-emitting element is ON and when it is OFF becomes equal to the corresponding difference in the light detection amount in the initial condition.

According to the configuration described above, the amount of the light emitted from the light-emitting element is changed from that of the initial condition in such a way as to increase the number of the light-receiving elements, among the light-receiving elements receiving the light from the light-emitting element without being blocked by the detection object, whose difference in the light detection amount when the light-emitting element is ON and when it is OFF is equal to the above-mentioned difference in the light detection amount, without the presence of the detection object, at the light-receiving element of the coordinate sensor in the initial condition.

Because the threshold can be set based on the results of the light reception by the light-receiving elements regardless of the presence or absence of the detection object, a coordinate sensor with high detection accuracy can be provided.

As discussed above, the configuration described above can provide a coordinate sensor that can set the threshold regardless of the presence or absence of the detection object, and can determine the coordinates of the detection object in a stable manner independently of changes in the ambient environmental light or in the ambient environmental temperature, or fluctuations in the amount of the light emitted from the light-emitting element disposed in the coordinate sensor or in the sensitivity of the light-receiving elements disposed in the coordinate sensor.

The above-mentioned "initial" refers to the stage in which the deterioration in the light-emitting performance of the light-emitting element or in the sensitivity of the light-receiving element through use (aging) has not occurred. This can be the time before the device is shipped out of the factory or before the device is used for the first time, for example.

That is, "the difference in the light detection amount at the light-receiving element when the light-emitting element was ON and when the light-emitting element was OFF when the coordinate sensor was in the initial condition" means that the difference between the light detection amount at the light-receiving element when the light-emitting element was ON and the light detection amount at the light-receiving element when the light-emitting element was OFF when the coordinate sensor was new and had never been used (before being shipped out of the factory, for example). Further, to put it in other words, it is the difference between the light detection amount at the light-receiving element without the presence of a detection object when the light-emitting element is ON and the light detection amount at the light-receiving element without the presence of a detection object when the light-emitting element is OFF before any deterioration of the constituting parts (light-receiving elements, light-emitting element, and the like) of the coordinate sensor through use has occurred.

A display device of the present invention features that it is equipped with the above-mentioned coordinate sensor to solve the above-mentioned problems.

According to the configuration described above, the display device, which includes the above-mentioned coordinate sensor, can determine the coordinates of a detection object in a stable manner regardless of changes in the ambient environmental light or the ambient environmental temperature, or fluctuations in the amount of the light emitted from the light-emitting element disposed in the coordinate sensor or the sensitivity of the light-receiving elements disposed in the coordinate sensor.

Effects of the Invention

As discussed above, a coordinate sensor of the present invention is configured such that the amount of the light emitted from the light-emitting element is changed from that of the initial condition in such a way as to increase the number of the light-receiving elements, among the light-receiving elements receiving the light from the light-emitting element without being blocked by the detection object, whose difference in light detection amount when the light-emitting element is ON and when the light-emitting element is OFF is equal to the difference in the light detection amount, with no detection object present, at the light-receiving elements of the coordinate sensor in the initial condition when the light-emitting element was ON and when the light-emitting element was OFF.

As described above, a display device of the present invention is configured to include the above-mentioned coordinate sensor.

Therefore, the present invention provides a coordinate sensor and a display device that, regardless of the presence or absence of a detection object, can set a threshold that serves as a reference for determining the presence or absence of a detection object, and can determine the coordinates of a detection object in a stable manner independently of the changes in the ambient environmental light or in the ambient environmental temperature, or the fluctuation in the amount of the light emitted from the light-emitting element or the sensitivity of the light-receiving element, both disposed in the coordinate sensor.

DETAILED DESCRIPTION OF EMBODIMENTS

Below, embodiments of the present invention are described in detail in reference to figures. Dimensions, materials, shapes, and relative positions of constituting members mentioned in the description of embodiments are only examples, and the scope of the present invention should not be interpreted in a limited manner by them.

Below, with reference to FIG. 1 to FIG. 10, a liquid crystal display device 1 having a built-in coordinate sensor (built-in touch panel) is described as an example of the display device equipped with a coordinate sensor of the present invention.

Figure 1:
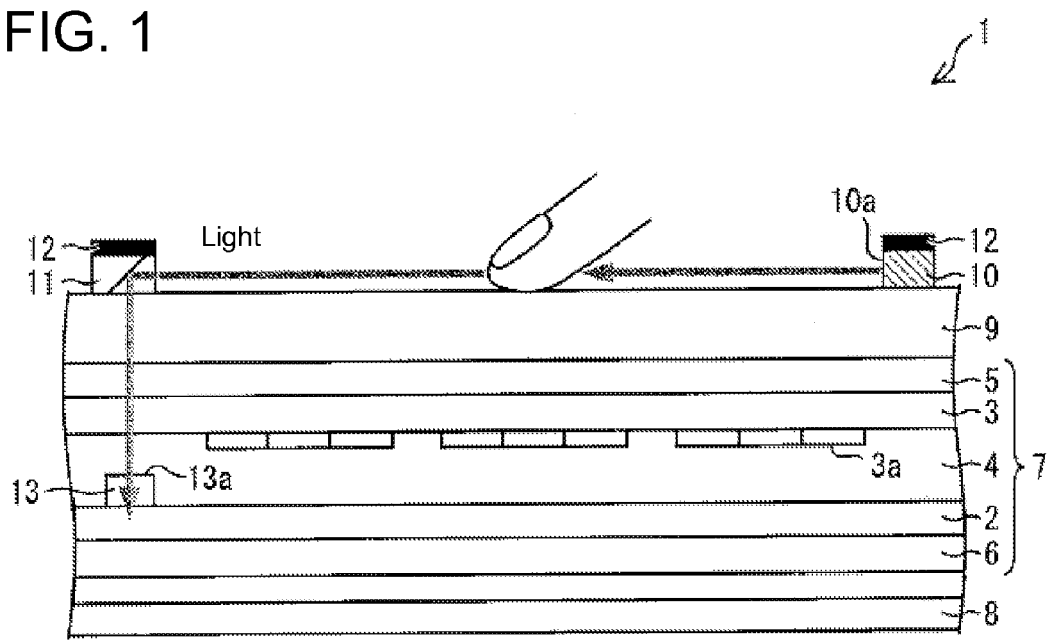
FIG. 1 schematically shows a configuration of a liquid crystal display device having a built-in coordinate sensor according to an embodiment of the present invention.

FIG. 1 schematically shows a configuration of a liquid crystal display device 1 having a built-in coordinate sensor.

As shown in the figure, the liquid crystal display device 1 includes a liquid crystal panel 7, a backlight 8, a light-emitting diode 10, a light-receiving minor 11 that serves as the light path change section, a light-shielding films 12 (light-shielding body) formed on the light-emitting diode 10 and on the light-receiving mirror 11, and line sensors 13 where light sensors (light-receiving elements) are arranged in respective X and Y directions.

Figure 2:
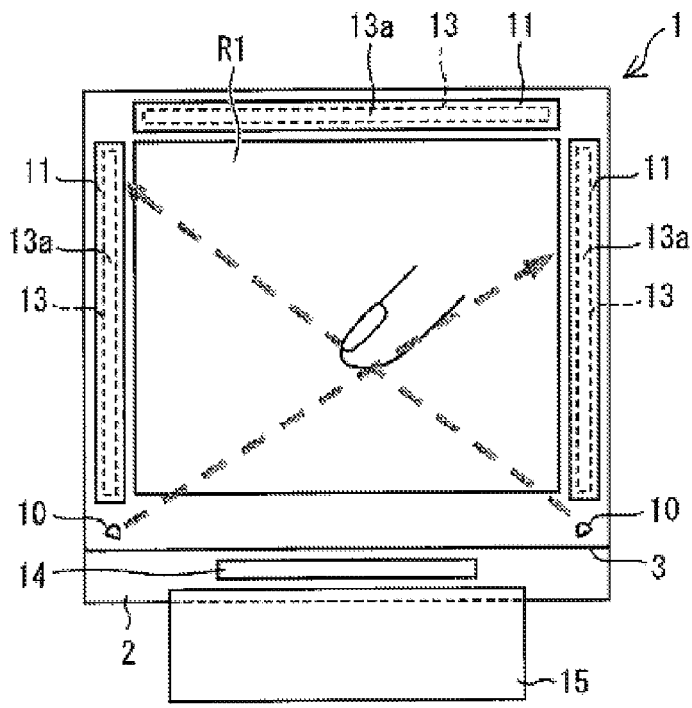
FIG. 2 shows the liquid crystal display device according to an embodiment of the present invention illustrated in FIG. 1, as observed from the display side.

FIG. 2 shows the liquid crystal display device 1 as observed from the side of the display.

Below, with reference to FIG. 2, the coordinate sensor provided in the liquid crystal display device 1 is described in further detail.

As illustrated in the figure, in the coordinate sensor provided in the liquid crystal display device 1 of the present embodiment, two light-emitting diodes 10 are disposed outside of the respective ends of the lower side of the display region (coordinate input region of the coordinate sensor) R1 of the liquid crystal display device 1 as the light sources (light-emitting elements) for the coordinate sensor.

As shown in FIG. 1, the light-emitting diodes 10 delivers light along the surface of the protective plate 9 disposed on the side opposite to the backlight 8 in the liquid crystal panel 7, such that the light covers the entire surface of the coordinate input region R1.

In the present embodiment, two emitting diodes 10 are used as the light source of the coordinate sensor, but the location and the number of the light-emitting diodes are not specially limited as long as the entire coordinate input region R1 of the coordinate sensor is irradiated with the light.

The light-emitting diodes 10 are preferably configured to emit the infrared ray or ultraviolet ray.

By using the light-emitting diodes 10 that emit the infrared ray or ultraviolet ray, the coordinate of the detection object can be determined without affecting the display condition of the liquid crystal display device 1.

In the present embodiment, although light-emitting diodes 10 are used as the light source (light-emitting element) for the coordinate sensor, the light-emitting element is not limited to such. The light-emitting element can be a combination of laser light and a lens that collects and diffuses the light, or a combination of a lens and a fluorescent tube or a light bulb that provides visible light. However, in consideration of an influence to the display condition of the liquid crystal display device 1, and the size and costs, light-emitting diodes 10 are preferably used.

As shown in FIG. 1, the liquid crystal panel 7 includes an active matrix substrate 2 having pixel TFTs (active element) for driving pixel electrodes according to the image signal data (not shown) and line sensors 13, and an opposite substrate 3 having a color filter layer 3a. The active matrix substrate 2 and the opposite substrate 3 are disposed facing each other, and a liquid crystal layer 4 is sandwiched between the substrates 2 and 3 and sealed in with a sealing member.

Further, an upper polarizing plate 5 is disposed on the opposite substrate 3, and a lower polarizing plate 6 is disposed on the active matrix substrate 2.

The protective plate 9 is omitted in FIG. 2, which shows the liquid crystal display device 1 from the display side.

In the present embodiment, because the line sensors 13 are provided in the same manufacturing step as the pixel TFTs, which are formed on the active matrix substrate 2, the line sensors 13 are formed on the active matrix substrate 2 on the same side as the pixel TFTs.

Also, as mentioned above, the light-emitting diode 10 delivers light along the surface of the protective plate 9 disposed on the liquid crystal panel 7 on the side opposite from the side on which the backlight 8 is disposed, to cover the entire surface of the coordinate input region R1 of the coordinate sensor. In order to guide this light to the light-receiving surface 13a of the light sensors provided in the line sensors 13 on the surface of the active matrix substrate 2 on the side on which pixel TFTs are formed, light-receiving mirrors 11 are provided as a light path change section.

However, although not illustrated, the line sensors 13 do not have to be disposed on the active matrix substrate 2. In the case that the line sensors 13 are disposed on the protective plate 9 and the light-receiving surfaces 13a of the light sensors provided on the line sensors 13 are disposed to face the light-emitting surface 10a of the light-emitting diode 10, for example, there is no need to install light-receiving mirrors 11.

As the protective plate 9, a material that does not lower the visibility of the display region R1 of the liquid crystal display device 1 and that can protect the liquid crystal panel 7, such as an acrylic transparent material, may be used, but the material is not limited to this.

If the liquid crystal panel 7 is configured such that the light-emitting diodes 10 and the light-receiving mirrors 11 can be disposed directly on the opposite substrate 3 on the side opposite from the side facing the active matrix substrate 2, the light-emitting diode 10 and the light-receiving mirror 11 do not have to be disposed on the protective plate 9.

For example, by disposing an upper polarizing plate 5 only in a region on the opposite substrate 3 that corresponds to the display region (coordinate input region of the coordinate sensor) R1, the light-emitting diode 10 and the light-receiving minor 11 can directly be disposed on the opposite substrate 3 outside the display region (the coordinate input region of the coordinate sensor) R1.

In the present embodiment, the light-receiving mirror 11 has a prism having an inclined surface formed or polished into a 45° minor, for example, and the prism is disposed at the edge of the top surface of the protective plate 9. However, as long as the light projected from the light-emitting diode 10 can be guided to the light-receiving surfaces 13a of the light sensors provided in the line sensor 13, the configuration does not need to be limited to this.

Also, as shown in FIG. 1, a light-shielding film 12 is formed on the light-emitting diode 10 and on the light-receiving minor 11.

The light-shielding film 12 disposed over the light-emitting diode 10 reduces the amount of the light directly projected from the light-emitting diode 10 towards the viewer of the liquid crystal display device 1.

The light-shielding film 12 disposed over the light-receiving minor 11 prevents the light other than the light projected from the light-emitting diode 10 (sunlight, for example) from entering the light-receiving surface 13a of the light sensors provided in the line sensor 13.

As shown in FIG. 2, in the coordinate sensor disposed in the liquid crystal display device 1 of the present embodiment, the light-receiving minors 11 are disposed outside the top side, left side, and right side of the display region (coordinate input region of the coordinate sensor) R1 of the liquid crystal display device 1, and the three line sensors 13 are respectively disposed outside the top side, left side, and right side of the display region (coordinate input region of the coordinate sensor) R1 of the liquid crystal display device 1 such that they overlap the light-receiving minors 11 when observed in a plan view.

The locations at which the light-receiving mirrors 11 and the line sensors 13 are disposed and the number of the light-receiving mirrors 11 and the line sensors 13 are not especially limited. They can be determined as appropriate in consideration of the light-emitting characteristics, locations, the number of the light-emitting diodes 10, and the like.

In the present embodiment, for a narrower frame of the liquid crystal display device 1, the light-receiving minor 11 overlaps the line sensor 13, because a prism having an inclined surface formed or polished to be a 45° mirror is used as the light-receiving minor 11. However, other configurations are also possible.

As shown in FIG. 2, the active matrix substrate 2 extends longer than the opposite substrate 3 in the down direction in the figure. On a portion 14 of the active matrix substrate 2 that does not overlap with the opposite substrate 3, an A/D conversion circuit and a gate/source driver circuit, which will be discussed in detail below, for example, may be mounted, using the COG (Chip On Glass) technology.

Further, other driver chips or the like can be mounted on the FPC 15 (Flexible Printed Circuits).

The light sensors disposed in the line sensor 13 can be formed of photodiodes, photo-transistors, or the like, and are configured to detect the amount of the light received by outputting the current or the potential corresponding to the amount of the light received.

The light sensor is not limited to particular kinds as long as it detects the light emitted from the light-emitting diode 10, which is the light source for determining a pointer coordinate. The light sensor that can be used may be made from, for example, a-Si (amorphous silicon), p-Si (polysilicon, polycrystalline silicon), or CG silicon (Continuous Grain Silicon).

Figure 3:
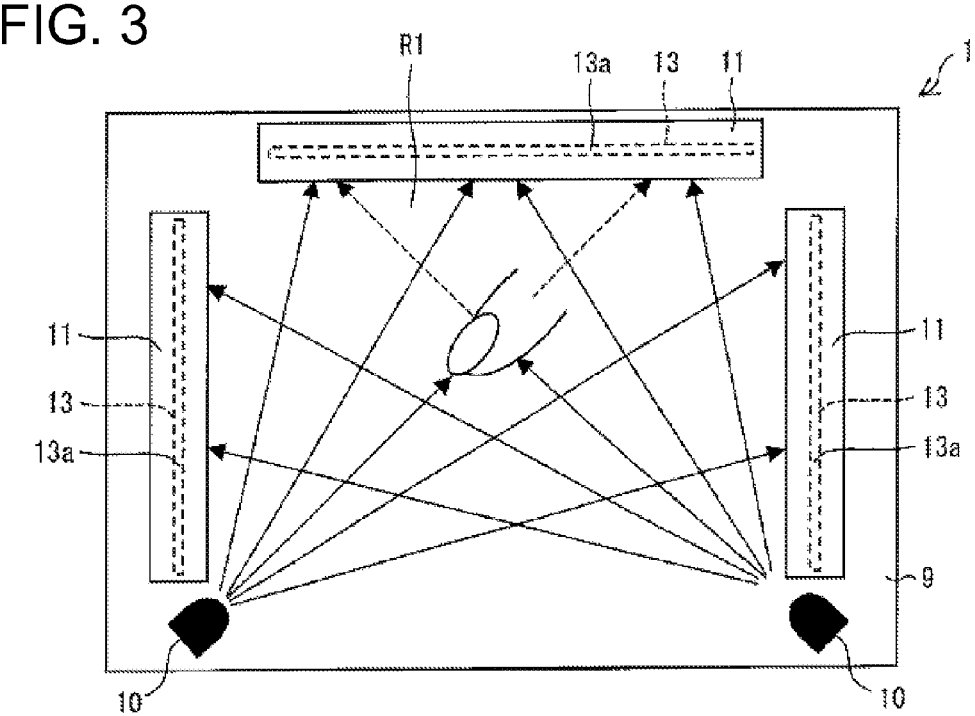
FIG. 3 is a schematic plan view showing a configuration of the main part of the liquid crystal display device according to the embodiment of the present invention shown in FIG. 1, and the principles of the coordinate determination of the liquid crystal display device.

FIG. 3 is a plan view schematically illustrating a simplified configuration of the main part of the liquid crystal display device 1 and the principles of the coordinate detection.

With reference to FIG. 3, a case of determining the location of a detection object based on the shadow of the detection object such as a finger is described. The shadow is formed due to the light from the light-emitting diodes 10, and the light, which proceeds radially within a plane parallel to the display region (the coordinate input region of the coordinate sensor) R1 of the liquid crystal display device 1, is guided towards the light-receiving surfaces 13a of the line sensors 13 in order to determine the location of the detection object.

As shown in FIG. 3, if the light that propagates radially within a plane parallel to the display region (the coordinate input region of the coordinate sensor) R1 of the liquid crystal display device 1 is blocked by a detection object such as a finger, the light path behind the detection object as viewed from the light-emitting diode 10 is shadowed by the detection object (shown as dashed lines in the figure).

As a result, reduced light enters a certain region of the line sensor 13 that is behind the detection object as viewed from the light-emitting diode 10 (line sensor 13 shown at the top of the figure).

Consequently, the detection signal level of the region of the line sensor 13 that is shadowed by the detection object becomes lower than the detection signal level of the region of the line sensor 13 that is not shadowed. From the location of the shadow, therefore, the location of a touch with a detection object such as a finger can be determined by triangulation.

Specific procedure of determining the coordinates of the detection object by triangulation is discussed in detail below.

In the present embodiment, two light-emitting diodes 10 are turned on alternately. That is, when the light-emitting diode 10 at right in the figure is ON, light is received by the line sensors 13 at the top and at left in the figure, and when the light-emitting diode 10 at left in the figure is ON, light is received by the line sensors 13 at the top and at left in the figure to determine the coordinates of the detection object.

Figure 4:
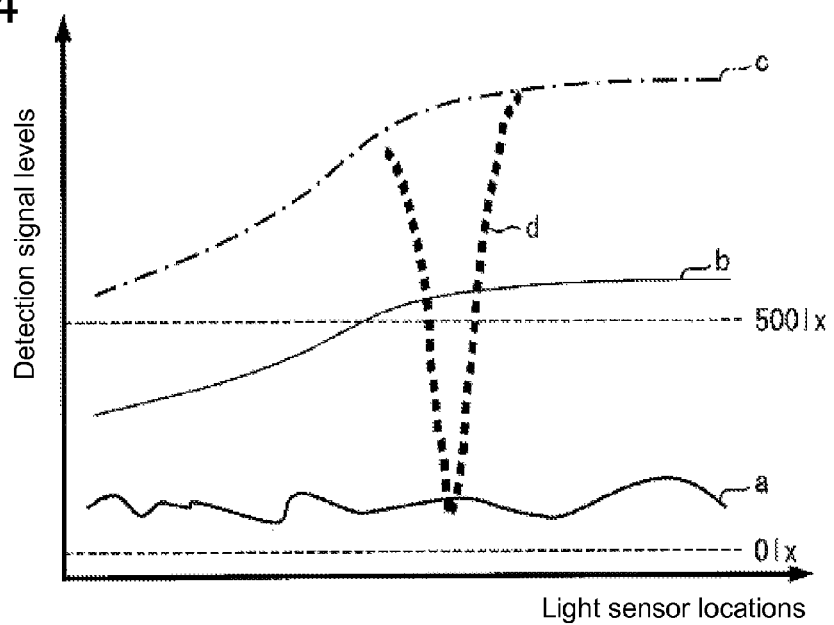
FIG. 4 shows the detection signal levels of the light sensor provided in the liquid crystal display device according to an embodiment of the present invention. Shown are the signal levels in the shadowed region where the light is blocked by a detection object and the signal levels in the area that is not shadowed.

FIG. 4 shows the detection signal level of the region of the light sensor that is shadowed by the detection object, and the detection signal level of the region of the light sensor that is not shadowed.

FIG. 4 shows the detection signal levels when the light-emitting diode 10 at right in FIG. 3 is ON and the light is received by the line sensors 13 at the top and at left. The detection signal levels are plotted against the locations of the light sensors.

Even though the light-shielding films 12 are provided, as shown in FIG. 1, to prevent light other than the light emitted from the light-emitting diode 10 (sunlight, for example) from entering the line sensor 13, in an environment under strong sunlight such as outdoors, for example, the sunlight cannot completely be blocked from entering the line sensor 13.

The amount of the light other than the light emitted from the light-emitting diode 10 that enters the line sensor 13 without being blocked becomes a noise (the line "a" in FIG. 4) when determining the coordinates pointed by the detection object, and becomes a factor that lowers the detection accuracy.

Line "b" in the figure represents threshold values prescribed to be used as reference values for determining the presence or absence of the detection object for the respective light sensors.

Line "c" of the figure represents the detection signal levels of the respective light sensors when no detection object is present. As shown in the figure, the detection signal levels depend on the locations of the light sensors.

Figure 5:
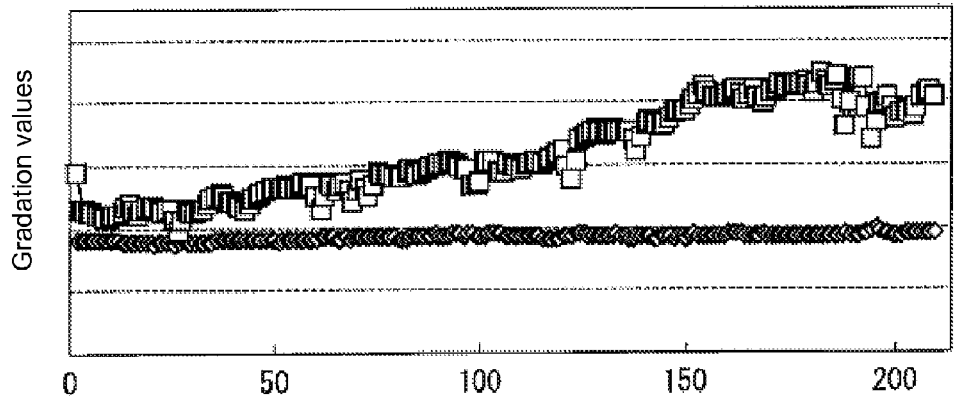
FIG. 5 shows the location dependency of the incoming light detected by the light sensors provided in the liquid crystal display device according to an embodiment of the present invention.

FIG. 5 shows the location dependency of the amount of light entering the light sensors provided in the line sensor 13 when the detection object is not present.

FIG. 5 shows the amount of the light entering the light sensors. This is the digitalized detection signal levels representing the light detection amount at the light sensors, and is presented in 256 gradation values.

The horizontal axis in FIG. 5 corresponds to the numbering of the light sensors disposed in the line sensor 13 at the top side in FIG. 3. The number increases from the left end to the right end of the line sensor 13 at the top side.

In FIG. 5, the gradation values increases towards the right direction. This is due to the relationship between the directional characteristics of the light-emitting diode 10 at right in FIG. 3 and the locations of the light sensors when the light-emitting diode 10 is ON.

As discussed above, the amount of the light entering the light sensors disposed in the line sensor 13 reflects the positional dependence.

In FIG. 5, the minute fluctuation in gradation values is due to the differences in sensitivity of the individual light sensors.

On the other hand, when both light-emitting diodes 10 in FIG. 3 are OFF, the fluctuation in the gradation values is not large, but occurs frequently. This is due to the difference in sensitivity of the individual light sensors and the difference in location of installation.

Line "d" of FIG. 4 indicates the detection signal levels of the light sensors disposed in the region of the line sensor 13 that is shadowed by the detection object.

As illustrated in the figure, the detection signal levels of these light sensors are significantly lower than those of the light sensors in the region not shadowed by the detection object, and become lower than the threshold. The coordinate of the detection object can thus be determined.

On the other hand, in FIG. 4, if the noise (line "a") exceeds the threshold (line "b"), which is the reference value for determining whether the detection object is present or not, the pointer coordinate of the detection object is difficult to detect.

Also, because the light-emitting performance of the light-emitting diodes 10 and the sensitivity of the light sensors deteriorate through use (aging), the detection signal level (line "c") of the light sensors decreases gradually from the time they are used for the first time.

The noise (line "a"), therefore, decreases due to aging, but the detection signal level (line "c") of the light sensors also declines. As the detection signal level (line "c") approaches the threshold (line "b"), recognition error tends to occur, and the detection accuracy of the pointer coordinates of the detection object is significantly lowered.

The light-emitting performance of the light-emitting diodes 10 and the sensitivity of the light sensors are affected also by the ambient environmental temperature. Because the noise (line "a") and the detection signal levels (line "c") fluctuate depending on the ambient environmental temperature, the detection object can be falsely recognized or the detection can be difficult due to the fluctuation of the ambient environmental temperature.

Here, FIG. 4 shows the detection signal levels of the light sensors when the illuminance is 0 lux and 500 lux.

Below, with reference to FIG. 6, the method for determining the amount of the light emitted from the light-emitting diode 10, i.e., the current of the light-emitting diode 10, of the liquid crystal display device 1 in the initial condition is described.

Figure 6:
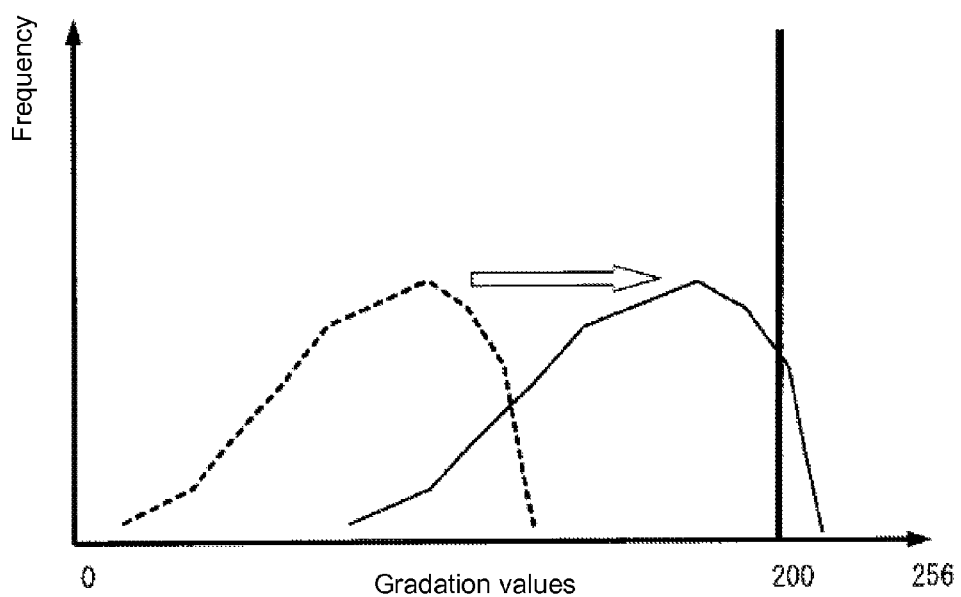
FIG. 6 shows the frequency distribution of gradation values of the light detection amount at light sensors disposed in the liquid crystal display device according to an embodiment of the present invention.

FIG. 6 shows the frequency distribution of the gradation values of the light sensors disposed in the line sensor 13.

FIG. 6 shows the gradation values of individual light sensors disposed in the line sensors 13 when the light-emitting diode 10 at right in FIG. 3 was ON and the light was received by the line sensors 13 at the top and at left of the figure.

The dashed line in the figure represents the frequency distribution of the gradation values of the plurality of light sensors when the current supplied to the light-emitting diode 10 is smaller than the optimum value. The solid line in the figure represents the frequency distribution of the gradation values of the light sensors when the current supplied to the light-emitting diode 10 is swept to a greater value for optimization.

In order to determine the presence or absence of the detection object, the light detection amounts at the line sensors 13 disposed in the line sensor 13 have to be no less than a predetermined value.

For example, when 256 is the maximum gradation value at the light sensors that receive light and the above-mentioned predetermined value is the gradation value of 30, the light detection amounts at the light sensors disposed in the line sensors 13 were found to vary up to about 5 times. The largest light detection amount of the light sensors, therefore, should be equal to or greater than the gradation value of 150, which is equivalent to about 60% of the gradation value 256—the maximum level at the light sensors that receive light.

Consequently, the initial current of the light-emitting diode 10 is preferably set to a value that places 10% of all the light sensors, which includes the light sensor having the largest light detection amount, higher than 60% of 256, which is the maximum possible gradation value at the light sensors.

In the present embodiment, as shown in FIG. 6, when the output values of individual light sensors are represented in 256 gradation values, which are digitized detection signal levels, the value of the current supplied to the light-emitting diode 10 is set as the current for the light diode 10 in the initial condition such that it places 10% of the light sensors (42 sensors if a total of 420 light sensors are disposed in the line sensors 13 at the top and at left) higher than 200 in gradation value (this corresponds to approx. 78% of the gradation value of 256, which is the maximum gradation value of the amount of the light that can be detected by the light sensors). However, the initial current setting is not limited to this. Any current that places 10% of the total light sensors higher than 60% of 256 in gradation value, 256 being the highest possible gradation value at the light sensors, can also be used.

The present embodiment is an example of the case that the maximum amount of the light that can be detected by the light sensor is at the gradation value of 256.

According to the above-mentioned configuration, the difference in the amount of the light received by the light sensors or the light detection amount at the light sensors when the light-emitting diode 10 is ON and when it is OFF can be increased and can be set within a range that does not have saturation.

In the manner as described above, the optimum current value of the right light-emitting diode 10 can be obtained, and the optimum current value of the left light-emitting diode 10 can also be obtained in like manner.

The optimized initial currents supplied to the light-emitting diodes 10, which are obtained as described above, are stored in the memory. The memory is described below.

Also, individual light sensors' output values when the optimized current is supplied to the light-emitting diode 10 are stored in the above-mentioned memory as the initial data acquired with the light-emitting diodes 10 turned ON (A values).

Further, individual light sensors' output values when the light-emitting diode 10 is OFF are stored in the above-mentioned memory as the initial data acquired with the light-emitting diode 10 turned OFF (B values).

Below, with reference to FIG. 7, a method of controlling and correcting the amount of the light emitted from the light-emitting diode 10 is described.

Figure 7:
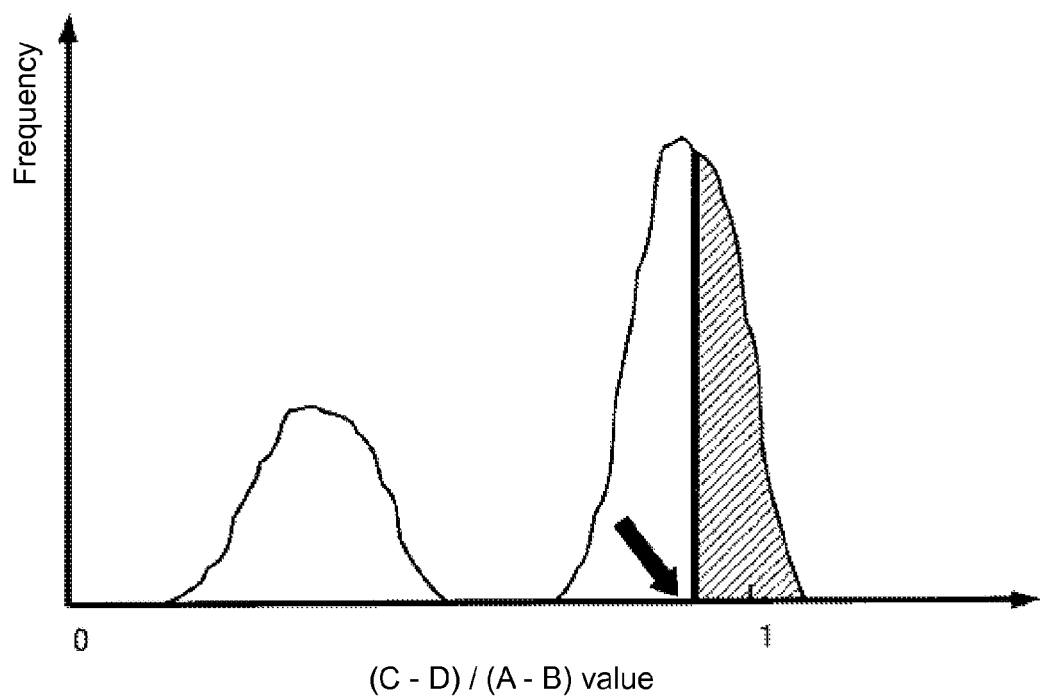
FIG. 7 illustrates an example of the method of correcting the current for the light-emitting diode when a liquid crystal display device according to an embodiment of the present invention is used.

FIG. 7 illustrates an example of the method of correcting the current of the light-emitting diode 10 when the liquid crystal display device 1 is in use.

FIG. 7 shows the frequency distribution of the calculation results of $(C-D)/(A-B)$ for each of the light sensors.

"A" in the above equation denotes the A value described above, and "B" in the above equation denotes the B value described above.

"C" in the above equation denotes the output value of an individual light sensor in use when the light-emitting diode 10 is ON, and "D" in the above equation denotes the output values of the individual light sensor in use when the light-emitting diode 10 is OFF.

If the environment is exactly the same as the initial condition, and there is no deterioration in the light-emitting diode 10 or in the sensitivity of the light sensors, all the data are plotted at "1" of the figure. In reality, however, the light-emitting performance of the light-emitting diode 10 and the sensitivity of the light sensors deteriorate as they are used (aging), or fluctuate due to the operation environment that is different from the initial environment, and therefore, as shown in the figure, some of the data are plotted away from "1".

Also, when a detection object such as a finger is present, when the light-emitting diode 10 is ON under actual use, some of the output values (C values) of the individual light sensors decrease, and therefore, as illustrated in the figure, another peak appears at a lower value.

The liquid crystal display device 1 is configured such that the amount of the light emitted from the light-emitting diode 10 is adjusted from that in the initial condition in such a way as to increase the number of the light sensors whose difference (C−D) in the light detection amount between when the light-emitting diode 10 is ON and when it is OFF is equal to the initial difference (A−B) in the light detection amount at the light sensor.

That is, the current for the light-emitting diode 10 is controlled and corrected using a reference value that is the difference (A−B) in the light detection amount at the light sensor when the light-emitting diode 10 was ON and when the light-emitting diode 10 was OFF when the light-emitting diode 10 and the light sensors were new (before being shipped out of the factory, for example) with no detection object present, i.e., when deterioration in the light-emitting performance of the light-emitting diode 10 or in the sensitivity of the light sensors through use (aging) has not occurred yet. The current for the light-emitting diode 10 is controlled and corrected such that the difference (C−D) in the light detection amount at the light sensor, which is experiencing the above-mentioned aging and is not blocked by the detection object, when the light-emitting diode is ON and when it is OFF becomes equal to the above-mentioned reference value.

In the present embodiment, the current of the light-emitting diode 10 is corrected to the value that is obtained by dividing the initial current value of the light-emitting diode 10, which is stored in the memory described below, by the value of (C−D)/(A−B) that is at the top 10 percentile of (C−D)/(A−B) values of all the individual light sensors (that is, the 42nd (C−D)/(A−B) value from the largest value if the total of 420 light sensors are disposed in the line sensors 13 at the top and at left).

In the present embodiment, because the bold line indicated by the arrow in FIG. 7, i.e., the (C−D)/(A−B) value that is at the top 10 percentile of all the (C−D)/(A−B) values of individual light sensors, is smaller than 1, the corrected current for the light-emitting diode 10 becomes larger than the initial current value, increasing the amount of the light emitted from the light-emitting diode 10.

Thus, as a result of the correction described above, of the plurality of light sensors that have been in use, the number of the light sensors whose difference in the light detection amount is equal to the initial difference (A−B) in the light detection amount increases.

Also in the present embodiment, when a detection object is placed at a position closest to the light-emitting diode 10, up to about 80% of the light sensors are shielded by the detection object. Therefore, the initial current value of the light-emitting diode 10 is corrected using the (C−D)/(A−B) value at the top 10 percentile among the (C−D)/(A−B) values of all the light sensors, which is the middle value of the remaining 20% of the light sensors that are not shielded. However, the present invention is not limited to this particular scheme.

When the detection object is placed at a location closest to the light-emitting diode 10, up to about 80% of the light sensors are shielded by the detection object. By correcting the initial current value of the light-emitting diode 10 using a (C−D)/(A−B) value that is within the top 0 to 20% range of (C−D)/(A−B) values of all the light sensors, the (C−D)/(A−B) value of a light sensor that is receiving light emitted from the light-emitting diode 10 without being blocked can be used always.

Of the light sensors provided in the liquid crystal display device 1, up to about 1% of them have poor characteristics. Taking this into consideration, it is preferable to use a (C−D)/(A−B) value that is within the top 2% to 20% of all the light sensors (i.e., any one of (C−D)/(A−B) values in the top 2 to 20% of (C−D)/(A−B) values of all the light sensors).

The C value and D value can be obtained by inserting "all OFF" at certain time intervals (every second, for example) in a repeated operation, such as: right light-emitting diode ON (left light-emitting diode OFF)→left light-emitting diode ON (right light-emitting diode OFF)→both light-emitting diodes OFF; or the right light-emitting diode ON (left light-emitting diode OFF)→left light-emitting diode ON (right light-emitting diode OFF)→right light-emitting diode ON (left light-emitting diode OFF) left light-emitting diode ON (right light-emitting diode OFF)→both light-emitting diodes OFF.

In the present embodiment, the corrected current data for the light-emitting diode 10 obtained by dividing the initial current value of the light-emitting diode 10, which is stored in the memory described below, by the (C−D)/(A−B) value at the top 10 percentile among (C−D)/(A−B) values of all the light sensors is sent to the driver circuit 28 that controls the light-emitting diode 10, i.e., the light source for the coordinate sensor, through the coordinate detection circuit 21 shown in FIG. 9, which is describe below. Thus, the amount of the light emitted from the light-emitting diode 10 is controlled.

This way, when a detection object is detected, the current value of the light-emitting diode 10 can be corrected in real time to control the amount of the light emitted.

In the present embodiment, the initial and corrected amount of the light emitted from the light-emitting diode 10 are controlled by adjusting the current of the light-emitting diode 10. However, the method of controlling the amount of the light is not limited to this. The control can be accomplished also by adjusting the duration the light is emitted from the light-emitting diode 10 through pulse width modulation.

The configuration described above provides a liquid crystal display device 1 that can detect the coordinates of an detection object in a stable manner, regardless of the presence or absence of a detection object, changes in the ambient environmental light or ambient environmental temperature, or the fluctuation in the amount of the light emitted from the light-emitting diode 10 provided in the coordinate sensor or in the sensitivity of the light sensors.

Below, the configuration of a line sensor 13 is described in more detail.

Figure 8:
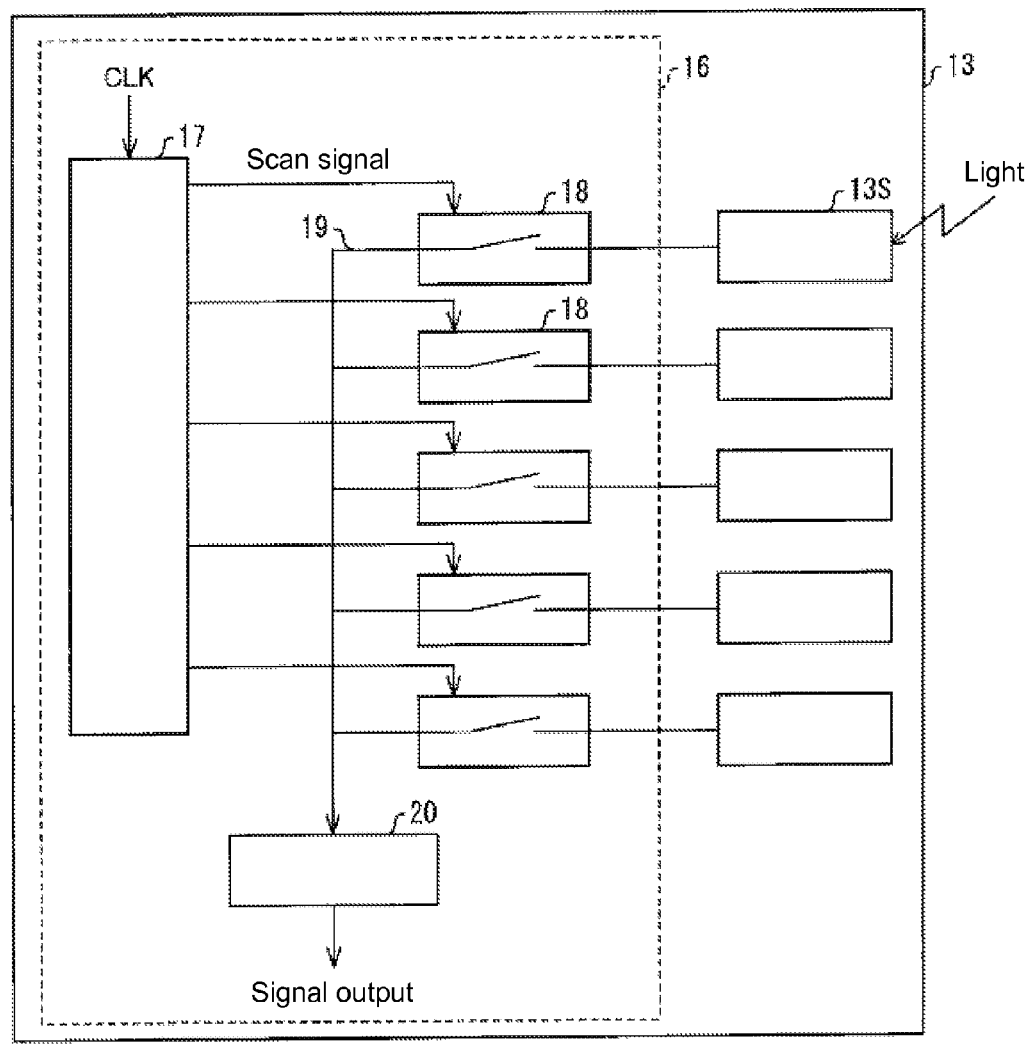
FIG. 8 is a block diagram schematically showing a configuration of a line sensor disposed in a liquid crystal display device according to an embodiment of the present invention.

FIG. 8 is a block diagram schematically showing a configuration of the line sensor 13.

As shown in the figure, the line sensor 13 includes light sensors 13S arranged unidirectionally (one-dimensional array), and a line sensor detection circuit 16. The line sensor detection circuit 16 functions as a scan signal circuit and a light signal read-out circuit.

As shown in FIG. 3, the line sensor 13 can be formed in the peripheral region of the active matrix substrate 2 with their light-receiving surfaces 13a facing up, as a unified part of the substrate.

The light sensors 13S can be formed over the active matrix substrate 2 on the same surface with and simultaneously with the circuits of the pixel TFTs or the like, using known semiconductor technologies.

The line sensor detection circuit 16 includes, as shown in the figure, a shift register 17, switching elements 18, a detection line 19, and an A/D (analog-digital) conversion circuit 20.

The light sensors 13S accumulate electrical charges when light enters from the outside.

When CLK (clock pulse) is input from the outside, the shift register 17 generates the scan signal that sequentially selects switching elements 18.

The switching elements 18 send out charges accumulated in the light sensors 13S to the detection line 19 according to the scan signal generated by the shift register 17. The signal of the detection line 19 is converted into digital data in the A/D conversion circuit 20, and is output to the coordinate detection circuit, which is described below.

Although FIG. 8 shows a line sensor 13 that includes five light sensors 13S and five switching elements 18 as an example, in the present embodiment, the line sensor 13 used is configured to include 210 light sensors 13S and 210 switching elements 18.

Figure 9:
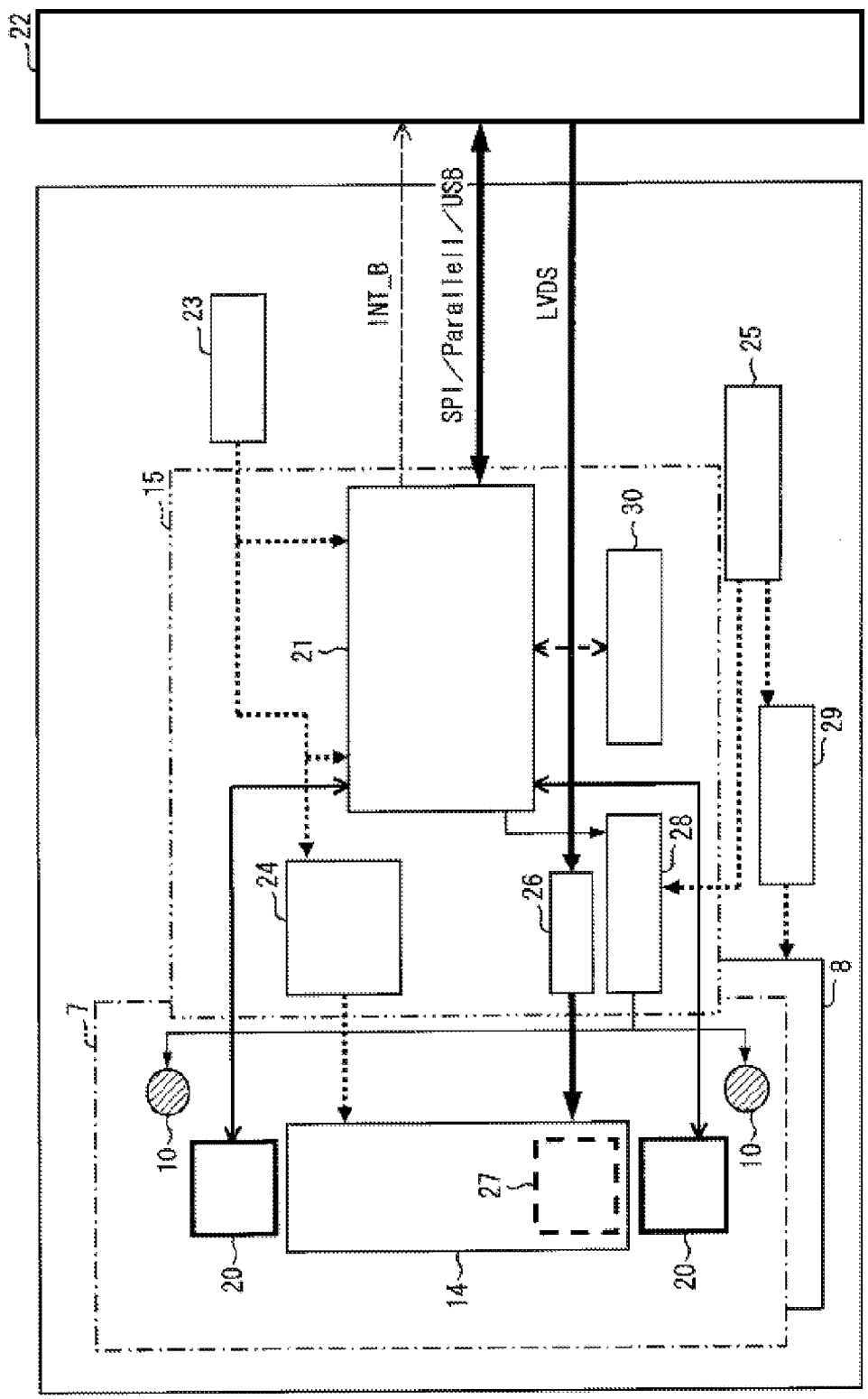
FIG. 9 is a system block diagram showing an example of the liquid crystal display device according to an embodiment of the present invention.

FIG. 9 is a system block diagram of the liquid crystal display device 1, which is shown as an example.

As shown in the figure, the main control unit 22 and the timing controller 26 are connected to each other in LVDS (Low Voltage Differential Signaling) system. Vertical synchronization signal, horizontal synchronization signal, data enable signal, RGB data signal, clock signal, and the like are sent from the main control unit 22 to the timing controller 26.

The timing controller 26 sends the RGB data signal to the source driver circuit, which is a constituent of the liquid crystal driver circuit 27, and controls the gate driver circuit, which is also a constituent of the liquid crystal driver circuit 27.

As described above, the charges accumulated in the light sensors 13S (not shown) provided in the liquid crystal panel 7 are converted into digital data by the A/D conversion circuit 20, and are then sent to the coordinate detection circuit 21.

In the memory 30, the A value, B value, and the initial current value of the light-emitting diode 10 described above are stored.

Further, the liquid crystal display device 1 includes a driver circuit 28 that controls the light-emitting diodes 10, which are the light source of the coordinate sensor, and a driver circuit 29 that controls light-emitting diodes provided in the backlight 8.

The logic power supply circuit 23 supplies power of 1.8V or 3.0V to the coordinate detection circuit 21 and the first power supply circuit 24.

The first power supply circuit 24 supplies power to the liquid crystal driver circuit 27 and the light sensors 13S (not shown).

The second power supply circuit 25 supplies power to the driver circuit 28 that controls the light-emitting diodes 10, which are the light source for the coordinate sensor, and to the driver circuit 29 that controls the light-emitting diodes provided in the backlight 8.

The coordinate detection circuit 21 and the main control unit 22 can be connected together via a connecting system such as SPI (Serial Peripheral Interface), parallel, or USB (Universal Serial Bus).

Also, as shown in the figure, upon coordinate determination, the interrupt signal (INT_B) is sent from the coordinate detection circuit 21 to the main control unit 22, and then the coordinate data is sent out.

As described above, liquid crystal display device 1 includes a line sensor detection circuit 16 that converts the light detection amounts at the light sensors 13S into digital signals, a memory 30 that stores the digital signals corresponding to the light detection amounts at the light sensors 13S when the light-emitting diode 10 was ON and when it was OFF when the light sensors 13S were in their initial condition and no detection object was present, and a coordinate detection circuit 21 that determines the location of the detection object.

The coordinate detection circuit 21 preferably determines that a detection object is present on coordinates that correspond to a light sensor 13S if the digital signal value corresponding to the light detection amount at the individual light sensor 13S when the light-emitting diode 10 is ON (C value) is smaller than the sum $(D+((A-B)/2))$ of (a) the half value $((A-B)/2)$ of the difference between the values obtained when the product was new (before being shipped out of the factory, for example) and stored in the memory 30, the values being digital signal values corresponding to the light detection amount at the light sensor 13S with no detection object present when the light-emitting diode 10 was ON and the light detection amount at the light sensor 13S when the light-emitting diode 10 was OFF, and (b) the digital signal value (D value) corresponding to the light detection amount at that individual light sensor 13S when the light-emitting diode is OFF.

According to the configuration described above, $D+((A-B)/2)$ is used as the threshold for determining the presence or absence of a detection object on the coordinates corresponding to the light sensor 13S.

Thus, according to the configuration described above, a liquid crystal display device 1 that can detect the coordinates of a detection object in a stable manner can be provided.

In the present embodiment, because the half value $((A-B)/2$, i.e., the value of 50% of the difference $(A-B)$), is used for setting the threshold so that the margin is maintained and the coordinates of a detection object can be determined in a more stable manner even if either the electrical signals when the light-emitting diode 10 is ON or the electrical signals when the light-emitting diode is OFF fluctuate. However, instead of the half value $((A-B)/2)$, a value of 20% to 80% of the difference $(A-B)$ can be used, where $(A-B)$ is a difference between digital value corresponding to the light detection amount at the light sensor with no detection object present when the light-emitting diode 10 was ON and the digital value corresponding to the light detection amount at the light sensor when the light-emitting diode 10 was OFF, when the product was in a brand new condition (the condition before the product was shipped out of the factory, for example), which have been stored in the memory 30.

Figure 10:
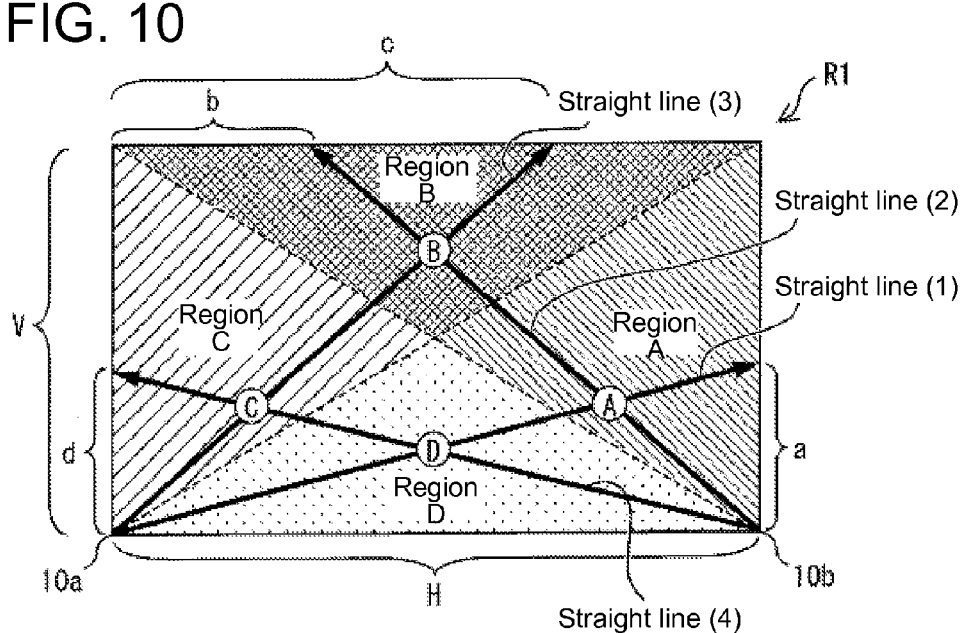
FIG. 10 illustrates a method of calculating the location of a touch with a detection object such as a finger using triangulation for the liquid crystal display device of an embodiment of the present invention.
Figure 11:
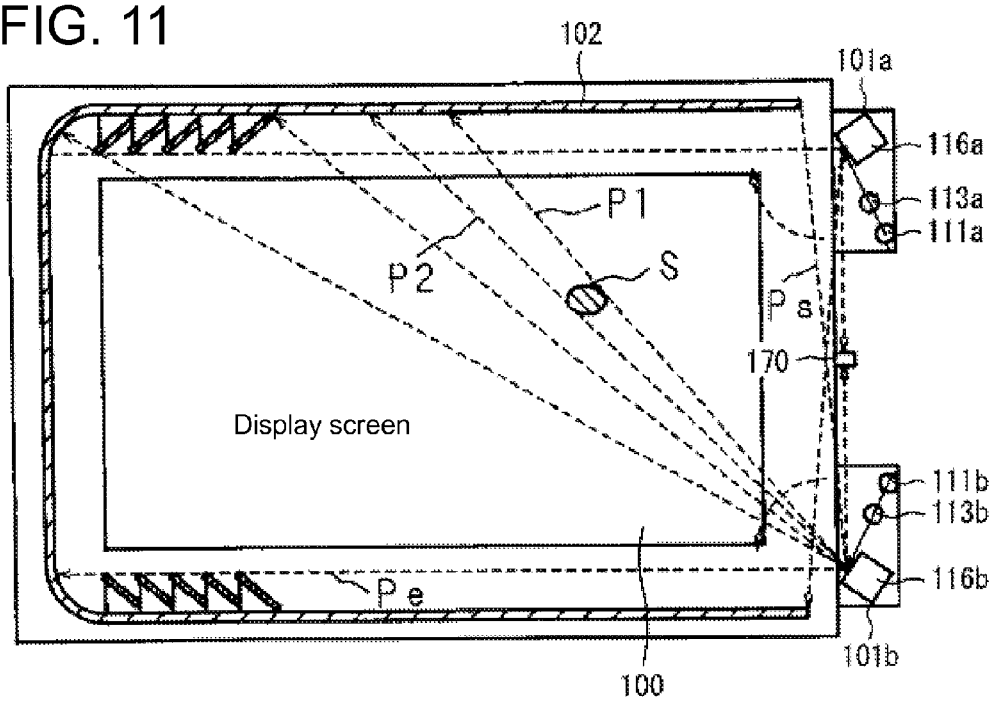
FIG. 11 schematically shows a configuration of a conventional optical scanning type touch panel.

FIG. 10 illustrates a triangulation method of calculating the location of a touch with a detection object such as a finger.

FIG. 10 shows the coordinate input region R1 of the liquid crystal display device 1 of FIG. 3.

As shown in the figure, the coordinates (x and y) of a detection object is calculated in four ways, depending on which region of the coordinate input region R1 is touched.

Below, to clarify the description, the light-emitting diode 10 located at left end of the side shown at the bottom of the figure (hereinafter referred to as "bottom side") is referred to as light source 10a, and the light-emitting diode 10 located at right end of the bottom side is referred to as light source 10b.

When the coordinate input region R1 is divided into four regions with diagonal lines, the triangle region having the side at right in the figure (hereinafter referred to as "right side") as the base, and the center point of the coordinate input region R1, which is the intersection point of the diagonal lines, as the apex (hereinafter simply referred to as "center point"), is defined as region A. Likewise, triangle regions having sides of the coordinate input region R1 as their bases, which are, counterclockwise, the side at the top of the figure (hereinafter referred to as "top side"), the side at left (hereinafter referred to as "left side"), and the bottom side, and commonly having the above-mentioned center point as their apexes are referred to as "region B," "region C," and "region D," respectively.

The length of the top side and the bottom side of the coordinate input region R1 is noted as "H", and the length of the right side and the left side is noted as "V".

When a point in the region A (hereinafter referred to as "point A") is touched, a shadow is formed behind (at the back of) point A as observed from the light source 10a. As a result, a shadow created by the light source 10a is casted on the right side. Likewise, a shadow created by the light source 10b is casted on the top side.

Here, a straight line (1) that passes through the light source 10a and point A can be expressed using coordinates x and y by Equation (1) below, where "a" is the distance from the light source 10b (i.e., the corner at the right end of the bottom side) to the location at which the straight line (1) passing through the light source 10a and point A intersects with the right side (i.e., the location of the shadow casted on the right side).

$$y = a \times x / H \tag{1}$$

On the other hand, a straight line (2) that passes through the light source 10b and point A can be expressed using coordinates x and y by Equation (2) below, where "b" is the distance from the corner located on the diagonal line extending from the light source 10b (i.e., the corner at the left end of the top side) to the location at which the straight line (2) that passes through the light source 10b and point A intersects with the top side (i.e., the location of the shadow casted on top side).

$$y = V(H - x) / (H - b) \tag{2}$$

From Equation (1) and Equation (2) above, Equation (3) below can be derived.

$$a \times x / H = V(H - x) / (H - b) \tag{3}$$

From Equation (3) above, the coordinates x and y of point A can be obtained with Equations (4) and (5) below, respectively.

$$x = H^2 \times V / (a \times H - a \times b + H \times V) \tag{4}$$

$$y = a \times H \times V / (a \times H - a \times b + H \times V) \tag{5}$$

Next, when a point in the region B (hereinafter referred to as "point B") is touched, the shadow created by the light source 10a and the shadow created by the light source 10b are both casted on the top side. In the description below, for simplicity, point B is assumed to be on the straight line (2) that passes through the light source 10b and point A. However, depending on the location of point B, variables "b" and "c" shown below can be changed accordingly to calculate the coordinates of 13 in the same way as below.

Here, a straight line (3) that passes through the light source 10a and point B can be expressed using the coordinates x and y by Equation (6) below, where "c" is the distance from the corner at the left end of the top side to the location at which the straight line (3) that passes through the light source 10a and point B intersects with the top side (i.e., the location of the shadow casted on top side).

$$y = V \times x / c \tag{6}$$

As described above, the straight line (2) that passes through the light source 10b and point B can be expressed using coordinates x and y by Equation (2), where "b" is the distance from the corner at the left end of the top side to the location at which the straight line (2) that passes through the light source 10b and point B intersects with the top side (i.e., the location of the shadow casted on the top side).

Therefore, from Equation (2) and Equation (6) above, Equation (7) below can be derived.

$$V \times x / c = V(H - x) / (H - b) \tag{7}$$

Consequently, from Equation (7) above, the coordinates (x and y) of point B can be determined using Equations (8) and (9), respectively.

$$x = c \times H / (H - b + c) \tag{8}$$

$$y = H \times V / (H - b + c) \tag{9}$$

When a point in the region C (hereinafter referred to as "point C") is touched, a shadow created by the light source 10a is casted on the top side, and a shadow created by the light source 10b is casted on the left side. In the description below, for simplicity, point C is assumed to be present on the straight line (3) that passes through the light source 10a and point B. Also in this case, however, depending on the location of point C, variables "c" and "d" below can be changed accordingly to calculate the coordinates of C in the same way as well.

The straight line (3) that passes through the light source 10a and point C can be expressed using coordinates x and y, by Equation (6) above, where "c" is the distance from the corner at the left end of the top side to the location at which the straight line (3) that passes through the light source 10a and point C intersects with the top side (i.e., the location of the shadow casted on the top side).

The straight line (4) that passes through the light source 10b and point C can be expressed using coordinates x and y by Equation (10) below, where "d" is the distance from the light source 10a (i.e., the corner at the left end of the bottom side) to the location at which the straight line (4) that passes through the light source 10b and point C intersects with the left side (i.e., the location of the shadow casted on the left side).

$$y = d - d \times x / H \tag{10}$$

From Equation (6) and Equation (10) above, Equation (11) below can be derived.

$$V \times x / c = d - d \times x / H \tag{11}$$

From Equation (11) above, the coordinates (x and y) of point C can be obtained by Equations (12) and (13) below.

$$x = c \times d \times H / (c \times d + H \times V) \tag{12}$$

$$y = d \times H \times V / (c \times d + H \times V) \tag{13}$$

When a point in the region D (hereinafter referred to as "point D") is touched, a shadow created by the light source 10a is casted on the right side, and a shadow created by the light source 10b is casted on the left side. In the description below, for simplicity, point D is assumed to be present at the point at which the straight line (1) that passes through the light source 10a and point A and the straight line (4) that passes through the light source 10b and point C intersect with each other. Also in this case, however, depending on the location of point D, variables "a" and "d" can be changed accordingly to calculate the coordinates of D in the same way as below.

Because point D is present on the straight line (1) that passes through the light source 10a and point A and on the straight line (4) that passes through the light source 10b and point C, the straight line (1) that passes through the light source 10a and point D and the straight line (4) that passes through the light source 10b and point D can be respectively expressed in Equations (1) and (10) above.

Therefore, the straight line that passes through the light source 10a and point D can be expressed using coordinates x and y by Equation (1) above, where "a" is the distance from the light source 10b to the location at which the straight line connecting the light source 10a and point D intersects with the right side (i.e., the location of the shadow casted on the right side). The straight line (4) that passes through the light source 10b and point D can be expressed using coordinates x and y by Equation (10) above, where "d" is the distance from the light source 10a to the location at which the straight line (4) that passes through the light source 10b and point D intersects with the left side (i.e., the location of the shadow casted on the left side).

Consequently, from Equation (1) and Equation (10) above, Equation (14) below can be derived.

$$a \times x/H = d - d \times x/H \qquad (14)$$

Therefore, from Equation (14) above, the coordinates (x and y) of point D are expressed in Equation (15) and Equation (16) below, respectively.

$$x = d \times H/(a+d) \qquad (15)$$

$$y = a \times d/(a+d) \qquad (16)$$

As described above, according to the present embodiment, the pointer coordinates of a detection object can be determined with triangulation, using the fact that the detection signal levels at the light sensors 13S (the light detection amounts at the light sensors 13S) that are located in a region of the line sensor 13 over which a shadow is casted are lower than the detection signal levels of the light sensors 13S located in a region of the line sensor 13, over which the shadow is not casted.

A coordinate sensor of the present invention includes: a light reception signal detection circuit that converts the light detection amount at each of the light-receiving elements into an electrical signal; a memory that stores data obtained when the coordinate sensor was in the initial condition, the data being the electrical signals respectively corresponding to light detection amounts at the light-receiving elements with no detection object present when the light-emitting element was ON and when the light-emitting element was OFF; and a coordinate detection circuit that determines the location of the detection object based on the electrical signals from the light reception signal detection circuit and the memory. The coordinate detection circuit preferably determines that the detection object is present on the coordinates corresponding to a light-receiving element if the electrical signal value corresponding to the light detection amount at the light-receiving element when the light-emitting element is ON is smaller than the sum of (a) a value corresponding to 20% to 80% of the difference between (i) the digital signal value corresponding to the light detection amount at the light-receiving element when the light-emitting element was ON and (ii) the digital signal value corresponding to the light detection amount at the light-receiving element when the light-emitting element was OFF which have been stored in the above-mentioned memory, and (b) the electrical signal value corresponding to the light detection amount at the light-receiving element.

In other words, if the difference between the electrical signal value corresponding to the light detection amount at the respective light-receiving element when the light-emitting element is ON and the electrical signal value corresponding to the light detection amount at the respective light-receiving element when the light-emitting element is OFF is smaller than 20% to 80% of the difference between the electrical signal value corresponding to the light detection amount when the light-emitting element was ON and the electrical signal value corresponding to the light detection amount when the light-emitting element was OFF, both of which values have been stored in the memory, the detection object is determined to be present on the coordinates corresponding to the light-receiving element.

According to the configuration described above, the threshold used to determine whether a detection object is present or not at the coordinates corresponding to a light-receiving element is the sum of (a) 20% to 80% of the difference in the initial electrical signal values corresponding to the light detection amount at the light-receiving element between when the light-emitting element was ON and when the light-emitting element was OFF, and (b) the electrical signal value corresponding to the light detection amount at the light-receiving element when the light-emitting element is OFF.

That is, the coordinate detection circuit is configured to determine that a detection object is present on the coordinates corresponding to a light-receiving element if the electrical signal value corresponding to the amount of received light at the light-receiving element when the light-emitting element is ON is smaller than the above-mentioned threshold.

According to the configuration above, therefore, a coordinate sensor that can determine the coordinates of a detection object in a stable manner can be provided.

In a coordinate sensor of the present invention, the coordinate detection circuit preferably determines that the detection object is present on the coordinates corresponding to a light-receiving element if the electrical signal value corresponding to the light detection amount at the light-receiving element when the light-emitting element is ON is smaller than the sum of (a) a value that is 50% of the difference between the electrical signal value corresponding to the light detection amount when the light-emitting element was ON and the electrical signal value corresponding to the light detection amount when the light-emitting element was OFF, both of which values have been stored in the memory, and (b) the electrical signal value corresponding to the light detection amount at the light-receiving element when the light-emitting element is OFF.

In other words, a coordinate sensor of the present invention is configured such that the detection object is determined to be present on coordinates corresponding to a light-receiving element if the difference between the electrical signal value corresponding to the light detection amount at the light-emitting element when the light-emitting element is ON and the electrical signal value corresponding to the light detection amount at the light-receiving element when the light-emitting element is OFF is smaller than ½ of the difference between the electrical signal value corresponding to the light detection amount when the light-emitting element was ON and the electrical signal value corresponding to the light detection amount when the light-emitting element was OFF, both of which values have been stored in the memory.

In the configuration above, the sum of (a) the half value of the difference in the initial electrical signal value corresponding to the light detection amount at the individual light-receiving element between when the light-emitting element was ON and when it was OFF (i.e., the value that is 50% of the above-mentioned difference) and (b) the electrical signal value corresponding to the light detection amount at the individual light-receiving element when the light-emitting element is OFF is used as the threshold for determining whether the detection object is present or not on coordinates corresponding to the light-receiving element.

That is, the coordinate detection circuit is configured to determine that a detection object is present along the coordinates corresponding to a light-receiving element if the electrical signal value corresponding to the amount of the received light at the light-receiving element when the light-emitting element is ON is smaller than the above-mentioned threshold.

Thus, by using the half value for setting a threshold, even when either the electrical signals when the light-emitting element is ON or the electrical signals when the light-emitting element is OFF fluctuate, a margin can be maintained. This makes it possible to provide a coordinate sensor that can determine the coordinates of a detection object in a more stable manner.

It is preferable that in the coordinate sensor of the present invention, the light-emitting element is a light-emitting diode. The current or the pulse width for the light-emitting diode is preferably set to the value obtained in the following manner. First, for each of the plurality of light-receiving elements, a difference in the light detection amount at the light-receiving element when the light-emitting diode is ON and when it is OFF is divided by the corresponding difference in the light detection amount in the above-mentioned initial condition when the light-receiving element was ON and when it was OFF to derive a quotient. Secondly, an initial current or an initial pulse width of the light-emitting diode is divided by a quotient that is within the top 2 to 20 percentile among the quotients for all of the light-receiving elements calculated as described above to obtain a corrected value for the light-emitting diode.

According to the configuration described above, the value obtained in the following manner is used as the corrected current value or the corrected pulse width of the light-emitting diode. First, for each of the light-receiving elements, the difference in the light detection amount when the light-emitting element is ON and when it is OFF is divided by the difference in the light detection amount when the light-emitting diode was ON and when it was OFF when the coordinate sensor was in the initial condition. Of the quotients thus obtained, a value that fall within the top 2 to 20% range is used as a divisor by which the initial current value or the initial pulse width for the light-emitting diode is divided to provide a corrected current value or a corrected pulse width.

By correcting the amount of the light emitted from the light-emitting diode as described above, among the plurality of light-receiving elements mentioned above, the number of the light-receiving elements whose above-mentioned difference in the amount of received light is equal to the initial corresponding difference in the amount of received light can be increased.

The reason that the above-mentioned quotient that falls in the range of top 2 to 20% of the total light-receiving elements is used is described below.

When a detection object is placed at a location closest to the light-emitting diode, the number of the light-receiving elements blocked by the detection object reaches the maximum.

The number of the light-receiving elements blocked by the detection object depends on the specifications of the coordinate sensor and the detection object, and usually is up to 80%.

Thus, by using a quotient belonging to the top 20% range as counted from the maximum quotient value among all of the light-receiving elements, the quotient for a light-receiving element for which the light emitted from the light-emitting element is not blocked by the detection object can always be used.

Considering the fact that up to about 1% of the light-receiving elements provided in the coordinate sensor has poor characteristics, a quotient within the top 2 to 20% of the total light-receiving elements is preferably used.

It is preferable that in the coordinate sensor of the present invention, the light-emitting elements are light-emitting diodes. The current value or the pulse width for a light-emitting diode in the initial condition is preferably set to a value that places 10% of all the light-receiving elements when the light-emitting diode is ON higher than 60% of the maximum possible light detection amount at the light-receiving elements.

In the configuration described above, the current value or the pulse width for the light-emitting diode in the initial condition is set such that when the light-emitting diode emits light with that current value or the pulse width, 10% of the total light-receiving elements are placed higher than 60% of the maximum possible light detection amount at the light-receiving elements.

Thus, for each of the light-receiving elements, the difference in the light detection amount when the light-emitting diode is ON and when it is OFF can be increased and can be set in a range that does not exhibit saturation.

In order to determine the presence or absence of the detection object, the light detection amount at each of the light-receiving elements needs to be at least the predetermined value.

For example, when 256 is the maximum gradation value at the light-receiving elements and the above-mentioned predetermined value is the gradation value of 30, the light detection amounts at the light-receiving elements disposed in the coordinate sensor were found to vary up to about 5 times. The largest light detection amount at the above-mentioned light sensors, therefore, should be the gradation value of at least 150, which is equivalent to about 60% of the maximum gradation value of 256.

Consequently, the current or the pulse width for the light-emitting diode in the initial condition is preferably set to a current or pulse width that places 10% of all of the light-receiving elements, which include the light sensors outputting the largest light detection amount, higher than 60% of the maximum possible value of the light detection amount at the light-receiving elements.

In the display device of the present invention, the line sensor is preferably disposed outside the display area of the display device.

According to the configuration above, because the line sensor including the plurality of light-receiving elements is disposed outside the display region of the display device, the visibility of the display region is not reduced by the line sensor.

It is preferable that the display device according to the present invention include an opposite substrate and an active matrix substrate, and the line sensor is disposed on the active matrix substrate on the surface where active elements are formed and is provided with a light path change section for guiding the light emitted from the light-emitting element towards the light-receiving surface of the light-receiving elements.

In the configuration described above, the display device includes an opposite substrate and an active matrix substrate, and the line sensor having the plurality of light-receiving elements is provided on the active matrix substrate on the surface on which active elements are formed.

For this reason, the line sensors can be formed when the active matrix substrate is manufactured.

The present invention is not limited to embodiments described above. Various modifications can be made within the scope defined by the appended claims, and embodiments that can be obtained by combining technological features disclosed in different embodiments are also included in the technological scope of the present invention.

INDUSTRIAL APPLICABILITY

The present invention can be used for coordinate sensors that determine the pointer coordinates of a detection object such as a finger or a pen, and for display devices equipped with such coordinate sensors.

DESCRIPTION OF REFERENCE CHARACTERS 1 liquid crystal display device (display device)
2 active matrix substrate
3 opposite substrate
10, 10a, 10b light-emitting diode (light-emitting element)
11 light-receiving mirror (light path change section)
12 light-shielding film (light-shielding body)
13 line sensor
13a light-receiving surface
13s light sensor (light-receiving element)
16 line sensor detection circuit (light reception signal detection circuit)
21 coordinate detection circuit
30 memory
R1 coordinate input region (display region)

The invention claimed is:

1. A coordinate sensor, comprising:
a light-emitting element;
at least two line sensors in which a plurality of light-receiving elements are arranged in X direction and Y direction, respectively; and
a light-shielding body that prevents light other than light emitted from said light-emitting element from entering said light-receiving elements,
a light reception signal detection circuit that converts the light detection amount at each of said light-receiving elements into an electrical signal;
a memory that stores electrical signals respectively corresponding to light detection amounts at said light-receiving elements with no detection object present when said light-emitting element was ON and when it was OFF when the coordinate sensor was in an initial condition; and
a coordinate detection circuit that determines the location of the detection object based on electrical signals from said light reception signal detection circuit and said memory,
wherein said coordinate detection circuit determines coordinates pointed by a detection object in accordance with changes in light detection amounts at said light-receiving elements,
wherein said coordinate detection circuit determines that the detection object is present on coordinates corresponding to a light-receiving element when an electrical signal value corresponding to the light detection amount at said light-receiving element when said light-emitting element is ON is smaller than a sum of:
 (a) a value in a range of 20% to 80% of the difference between (i) an electrical signal value corresponding to the light detection amount when the light-emitting element was ON and (ii) an electrical signal value corresponding to the light detection amount when the light-emitting element was OFF, both of which electrical signal values have been stored in said memory; and
 (b) an electrical signal value corresponding to the light detection amount at the light-receiving element when said light-emitting element is OFF, and
wherein said coordinate detection circuit causes the amount of light emitted from said light-emitting element to change from that in the initial condition so as to increase, among the light-receiving elements receiving light from said light-emitting element without being blocked by a detection object, the number of the light-receiving elements in which a difference between (i) the light detection amount when said light-emitting element is ON and (ii) the light detection amount when said light-emitting element is OFF is unchanged since the initial condition.

2. The coordinate sensor according to claim 1, wherein said coordinate detection circuit determines that the detection object is present on the coordinates corresponding to the light-receiving element when the electrical signal value corresponding to the light detection amount at said light-receiving element when said light-emitting element is ON is smaller than a sum of:
 (a) 50% of the difference between (i) the electrical signal value corresponding to the light detection amount when said light-emitting element was ON and (ii) the electrical signal value corresponding to the light detection amount when said light-emitting element was OFF, both of which values have been stored in said memory, and
 (b) the electrical signal value corresponding to the light detection amount at said light-receiving element when said light-emitting element is OFF.

3. The coordinate sensor according to claim 1,
wherein said light-emitting element is a light-emitting diode, and
wherein a current or a pulse width for said light-emitting diode in the initial condition is set to a value that places 10% of all the light-receiving elements higher than 60% of the maximum possible light detection amount at the light-receiving elements.

4. A coordinate sensor, comprising:
a light-emitting diode;
at least two line sensors in which a plurality of light-receiving elements are arranged in X direction and Y direction, respectively;
a light-shielding body that prevents light other than light emitted from said light-emitting diode from entering said light-receiving elements; and
a processor that receive signals from the plurality of light-receiving elements,
wherein coordinates pointed by a detection object are determined in accordance with changes in light detection amounts at said light-receiving elements,
wherein said processor causes the amount of light emitted from said light-emitting diode to change from that in an initial condition so as to increase, among the light-receiving elements receiving light from said light-emitting diode without being blocked by a detection object, the number of the light-receiving elements in which a difference between (i) the light detection amount when said light-emitting diode is ON and (ii) the light detection amount when said light-emitting diode is OFF is unchanged since the initial condition,
wherein the processor causes a current or a pulse width for said light-emitting diode to be updated to a value obtained in the following manner:
 (i) for each of said plurality of light-receiving elements, a difference in the light detection amount at the light-receiving element when said light-emitting diode is ON and when it is OFF is divided by a difference in the light detection amount at the light-receiving element in its initial condition when said light-emitting diode was ON and when it was OFF to derive a quotient, and (ii) an initial current or initial pulse width for said light-emitting diode is divided by a quotient that is within the top 2% to 20% percentile of the quotients of all the light-receiving elements to update the current or the pulse width for said light-emitting diode.

5. The coordinate sensor according to claim 4, wherein a current or a pulse width for said light-emitting diode in the initial condition is set to a value that places 10% of all the light-receiving elements higher than 60% of the maximum possible light detection amount at the light-receiving elements.

6. A display device comprising the coordinate sensor according to claim 1.

7. The display device according to claim 6, wherein said line sensors are disposed outside of a display region of said display device.

8. The display device according to claim 6, further comprising an opposite substrate and an active matrix substrate, wherein said line sensor is disposed on said active matrix substrate on a surface on which active elements are formed, and wherein said display device further comprises a light path change section for guiding the light emitted from said light-emitting element to light-receiving surfaces of said light-receiving elements.

9. A sensor for detecting an object to be placed on a detection surface, comprising:

a substrate having the detection surface;

a light source disposed at a location in the periphery of the detection surface, the light source intermittently or periodically emitting light substantially in parallel with the detection surface;

a plurality of photodetectors disposed on at least a portion of the periphery of the detection surface opposite to the light source to detect the light form the light source travelling across the detection surface;

a processor that processes photosignals from the plurality of photodetectors, the processor determining the presence or absence of the object to be detected in accordance with changes in the photosignals from the plurality of photodetectors that occur as a result of the object being present on or adjacent to the detection surface; and a memory that stores characteristics data indicating, for each of the plurality of photodetectors, an on/off photosignal difference, which is defined as a difference in photosignal when the light source is on and when the light source is off, wherein said stored characteristics data is obtained at a first point in time in the absence of the object to be detected, wherein, at a second point in time later than said first point in time, the processor receives photosignals from the plurality of photodetectors, regardless of whether the object is present at or prior to said second point in time, to generate updated characteristics data indicating, for each of the plurality of photodetectors, an updated on/off photosignal difference, and the processor causes the light source to adjust an intensity of the light in accordance with the updated characteristics data, and wherein the processor processes the updated characteristics data to select, among the plurality of photodetectors, a photodetector for which the updated on/off photosignal difference indicates that the object is not blocking the light from the light source to the photodetector, and causes the light source to adjust the intensity of the light such that the updated on/off photosignal difference at said selected photodetector becomes substantially equal to the on/off photosignal difference at said selected photodetector at the first point in time that has been stored in the memory.

10. The sensor according to claim 9, wherein in said photodetector selection, the processor selects a photodetector for which a quotient obtained by dividing the updated on/off photosignal difference by the on/off photosignal difference at the first point in time is placed at the 90th percentile among the plurality of photodetectors.

11. The sensor according to claim 9, wherein the processor determines that the object is present on a virtual line connecting the light source and a photodetector when an on/off photosignal difference at said photodetector is less than a prescribed fraction of the on/off photosignal difference at said photodetector at the first point in time stored in the memory.

12. The sensor according to claim 11, further comprising another light source that intermittently or periodically emits light at a timing different from the timing at which said light source emits the light, wherein the processor processes photosignals from the plurality of photodetectors generated in response to the light from said light source and said another light source to determine a two-dimensional position of the object on the detection surface.

13. A display device comprising the coordinate sensor according to claim 4.

14. The display device according to claim 13, wherein said line sensors are disposed outside of a display region of said display device.

15. The display device according to claim 13, further comprising an opposite substrate and an active matrix substrate, wherein said line sensor is disposed on said active matrix substrate on a surface on which active elements are formed, and wherein said display device further comprises a light path change section for guiding the light emitted from said light-emitting diode to light-receiving surfaces of said light-receiving elements.

* * * * *